United States Patent [19]
Seiichi

[11] Patent Number: 5,333,845
[45] Date of Patent: Aug. 2, 1994

[54] DAMPER DEVICE

[75] Inventor: Sato Seiichi, Yokohama, Japan

[73] Assignee: Kato Hatsuji Kaisha, Ltd., Yokohama, Japan

[21] Appl. No.: 9,633

[22] Filed: Jan. 27, 1993

[30] Foreign Application Priority Data

Mar. 25, 1992 [JP] Japan .............. 4-025040[U]

[51] Int. Cl.$^5$ ............................................ B60R 7/06
[52] U.S. Cl. ........................................ 267/711; 267/70
[58] Field of Search ................ 267/70, 71; 16/49, 66, 16/84; 188/301; 312/319.1, 319.2

[56] References Cited

U.S. PATENT DOCUMENTS

| 2,420,276 | 5/1947 | Wood | 267/70 |
| 2,841,813 | 7/1958 | Falk | 16/66 |
| 3,072,954 | 1/1963 | Patriquin | 16/66 |
| 4,920,609 | 5/1990 | Lin | 16/66 |
| 4,955,309 | 9/1990 | Ciccone | 267/70 |

FOREIGN PATENT DOCUMENTS

| 0348296 | 12/1989 | European Pat. Off. . |
| 2603062 | 2/1988 | France . |
| 63-196752 | 12/1988 | Japan . |
| 2-147350 | 12/1990 | Japan . |
| 2-147350 | 12/1990 | Japan . |

Primary Examiner—Robert J. Oberleitner
Assistant Examiner—Chris Schwartz
Attorney, Agent, or Firm—Wenderoth, Lind & Ponack

[57] ABSTRACT

An air cylinder damper device in combination with a storage cabinet includes a cylinder body having a front terminal opening, a piston slidably disposed inside the cylinder body, a spring member disposed inside the cylinder body for biasing the piston in a shutting direction of the storage cabinet, a string member having one terminal part thereof connected to the piston within the cylinder body, and a cap provided on the front terminal opening of the cylinder body and having a curved peripheral guide face capable of guiding the string member in the direction of disposition thereof. The opening motion of the storage cabinet is controlled by moving the piston in one direction through the string member against the biasing force of the spring member. The shutting motion of the storage cabinet is controlled by moving the piston in the opposite direction with to the biasing force of the spring member.

15 Claims, 8 Drawing Sheets

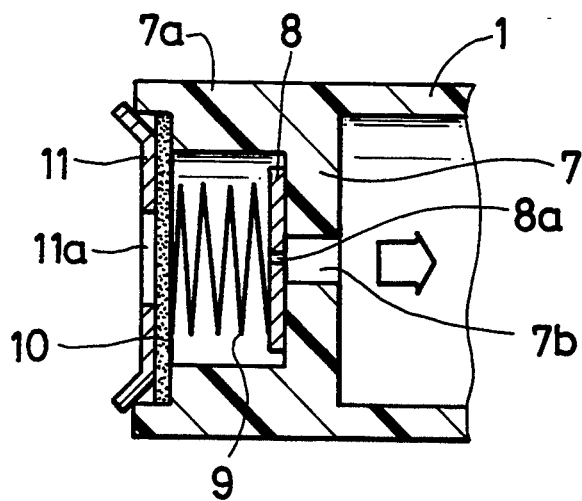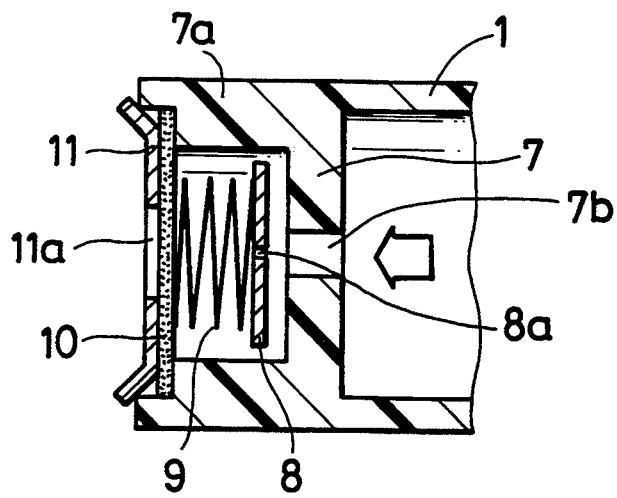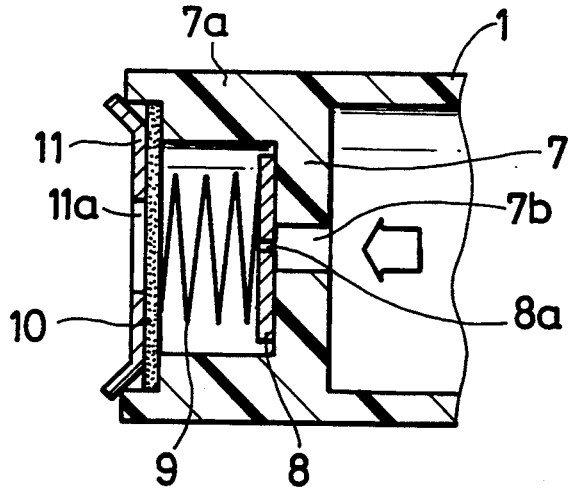

DAMPER DEVICE

BACKGROUND OF THE INVENTION

1. Field of the Invention

This invention relates to a damper device used in a storage cabinet such as a glove compartment furnished for the dashboard of an automobile.

2. Description of the Prior Art

A storage cabinet such as a glove compartment is, at times, required to be furnished with a damper device for controlling the opening and shutting motions of the storage cabinet for the purpose of preventing the storage cabinet from suddenly opening itself or emitting the unpleasant noise of an impact.

As damper devices fit for this purpose, air cylinder type damper devices disclosed in Japanese Utility Model Public Disclosures No. 63-196752 and No. 2-147350 have been proposed, for example.

These conventional damper devices, though not specifically illustrated herein, are constructed of a piston that has an O-ring provided on the circumferential edge thereof and is slidably disposed inside a cylinder body. A compression coil spring serves to urge the piston in one fixed direction. A long piston rod integrally extends from the piston and protrudes outwardly from the cylinder body. A string member has one terminal part thereof connected to the leading terminal part of the piston rod and the other terminal end of a string member fastened either to the peripheral member of the storage cabinet, when the cylinder body is fixed to the storage cabinet, or to the storage cabinet when the cylinder body is fixed to the peripheral member of the storage cabinet.

The conventional damper devices therefore require not only a guide means such as a roller for guiding the string member in the direction of disposition of the string member, but also such fixing parts as bolts and nuts for fixing the guide means at pertinent fixed positions. The natural consequence is that the number of component parts is proportionately increased, and the damper devices suffer from additional size and increased of cost. Further, during the assembly of an automobile, or the assembly of the damper device, therefore, the number of steps of work involved is augmented, and the operational efficiency of the assembly is jeopardized, possibly to the extent of posing a problem.

To make matters worse, in the conventional damper devices, an appreciable space must be secured between the long piston rod and the guide means so that the leading terminal part of the piston rod and the guide means avoid interfering with each other. The extra space thus required entails the problem of proportionately enlarging the device and consequently imposing a limit on the overall dimensions of the storage cabinet and diminishing the cabinet's capacity for storage.

One object of this invention is to provide an air cylinder type damper device which allows a perfect solution of the problems suffered by the conventional damper devices as described above.

SUMMARY OF THE INVENTION

To accomplish the object described above, according to this invention there is provided an air cylinder type damper device for a storage cabinet that comprises a cylinder body having a front terminal opening, a piston slidably disposed inside the cylinder body, a spring member disposed inside the cylinder body for biasing the piston in a shutting direction of the storage cabinet, a string member having one terminal part thereof connected to the piston within the cylinder body, and a cap provided on the front terminal opening of the cylinder body and possessed of a curved peripheral guide face capable of guiding the string member in the direction of disposition thereof. An opening motion of the storage cabinet is controlled by moving the piston in one direction through the string member against the biasing force of the spring member, and a shutting motion of the storage cabinet is controlled by moving the piston in the opposite direction through the string member owing to the biasing force of the spring member.

BRIEF DESCRIPTION OF THE DRAWINGS

The above and other objects, features and advantages of this invention will be specifically described below with reference to the accompanying drawings, in which:

FIG. 6 is a cross section illustrating an essential part of the damper device to aid in the explanation of the flow of air into the damper device.

FIG. 7 is a cross section illustrating the essential part of the damper device to aid in the explanation of the flow of air out of the damper device.

FIG. 8 is an explanatory cross section illustrating the essential part of the damper device in a state of equalized pressure.

DETAILED DESCRIPTION OF THE PREFERRED EMBODIMENTS

This invention will now be described in detail below with reference to the illustrated embodiment.

Figure 1:
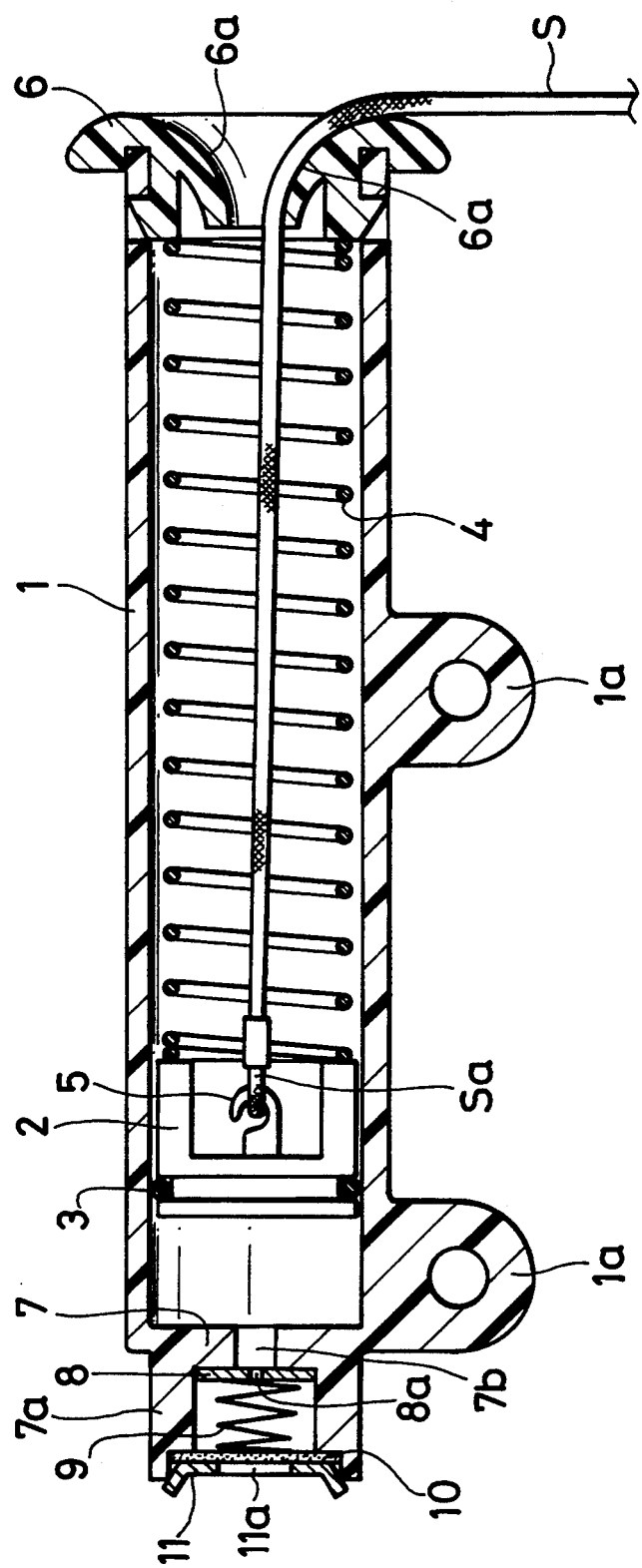
FIG. 1 is a cross section illustrating a first embodiment of the damper device according to this invention.

The first embodiment of the air cylinder type damper device according to this invention will be described with reference to FIG. 1. Basically, this damper device has a precondition that a piston 2 having an O-ring 3 set on a circumferential edge thereof be slidably disposed inside a cylinder body 1, and that a compression coil spring 4 be adapted to urge the piston 2 in one direction. The damper device is characterized by adopting a construction permitting one terminal part Sa of a string member S to be directly connected to the piston 2 inside the cylinder body 1, unlike the conventional damper device which has a long piston rod extending from the piston and connecting one terminal part of the string member to the piston.

In the first embodiment of this invention, therefore, the piston 2 is integrally provided with a hook part 5 for hooking the one terminal part Sa of the string member S. The cylinder body 1 has a front terminal opening part sheathed with a cap 6 made of resin and possessed of a curved peripheral guide face 6a capable of guiding the string member S connected to the hook part 5 in the direction of disposition of the string member S as illustrated in FIG. 1. The curved peripheral guide face 6a, as can be seen from FIG. 1, for example, thus curves from a portion thereof having an annular surface that faces radially inwardly and extends substantially axially with respect to the cylinder body 1 to a portion thereof that has an annular surface that faces substantially axially and extends substantially radially with respect to the cylinder body 1. In other words, the peripheral guide face 6a curves from a position capable of guiding the string member S axially coming out of the cylinder body 1, to a position where the string member S has turned 90 degrees, as illustrated in FIG. 1. The curved peripheral guide face 6a further curves to a portion thereof that has an annular surface that faces radially outwardly and extends substantially axially with respect to the cylinder body 1.

The string member S can therefore freely protrude in a desired direction from within the cylinder body 1 by the guiding action of the peripheral guide face 6a of the cap 6 without requiring the use of a guide means, such as a roller, found in the conventional device. Thus, it completely obviates the necessity for the guide means, which is indispensable to the conventional device, and the fixing parts which are necessary for the guide means. It has absolutely no possibility of sustaining a fracture because it contacts only the curved peripheral guide face 6a. Moreover, the omission of the piston rod allows the entirety of the device, inclusive of the cylinder body 1, to be miniaturized.

Further in the first embodiment, a rear wall 7, provided with a cylindrical part 7a and an air vent 7b, is integrally formed on the rear terminal part side of the cylinder body 1. A seating valve 8 containing an orifice 8a, a backup spring 9 and an air filter 10 are sequentially disposed in the order mentioned inside the cylindrical part 7a. A retainer 11 provided with an opening 11a is set in place so as to fix the air filter 10.

Inside the cylindrical part 7a, therefore, the seating valve 8 is attached fast to the surface of the rear wall 7 and the air filter 10 is pressed against the surface of the retainer 11 by virtue of the spring pressure of the backup spring 9. This air filter 10 is desirably formed of a porous resin such as porous ethylene tetrafluoride resin so that the air filter 10 can produce a prescribed amount of resistance and simultaneously allow the flow of air and permit a fine adjustment of the flow volume of the air and, at the same time, manifest the function of absorbing noise owing to the action of the numerous minute pores.

The damper device constructed as described above, therefore, is installed in its working position simply by utilizing a fitting part 1a formed on the cylinder body 1 for fixing the cylinder body 1 at a stated position by means of screws, for example. In this case, the fixation of the cylinder body 1 is attained at an optimum site, freely selected due to the direction of disposition of the string member S and the miniaturization allowed for the cylinder body 1.

Figure 2:
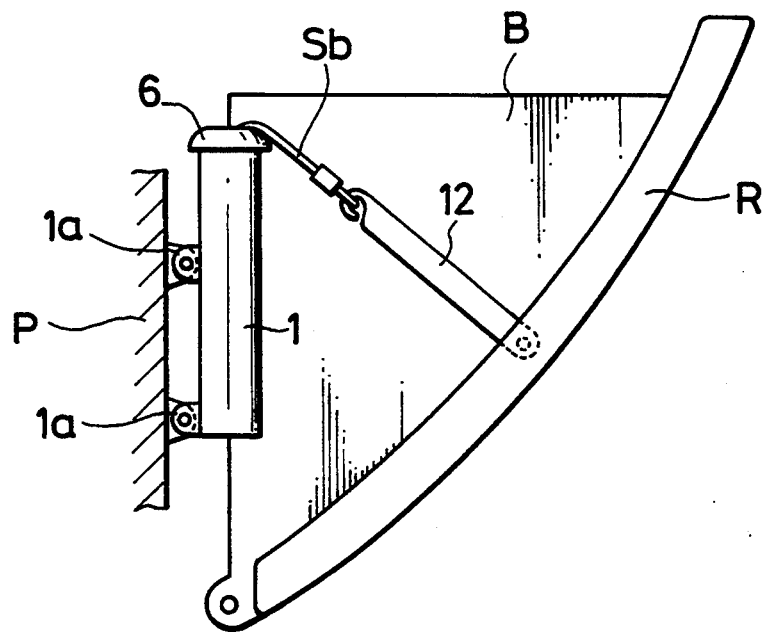
FIG. 2 is an explanatory view illustrating a first example of the state of attachment of the damper device.
Figure 3:
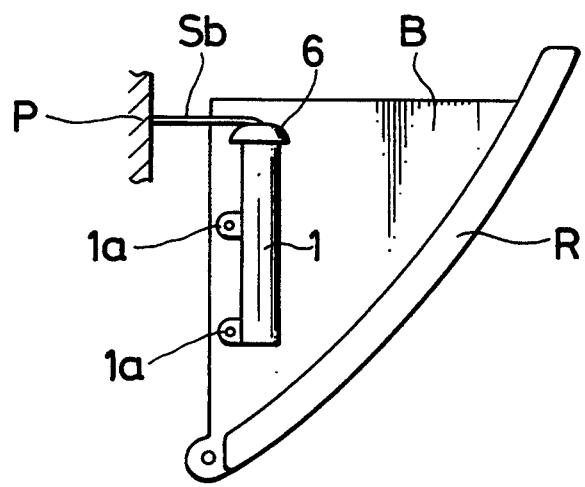
FIG. 3 is an explanatory view illustrating a second example of the state of attachment of the damper device.
Figure 4:
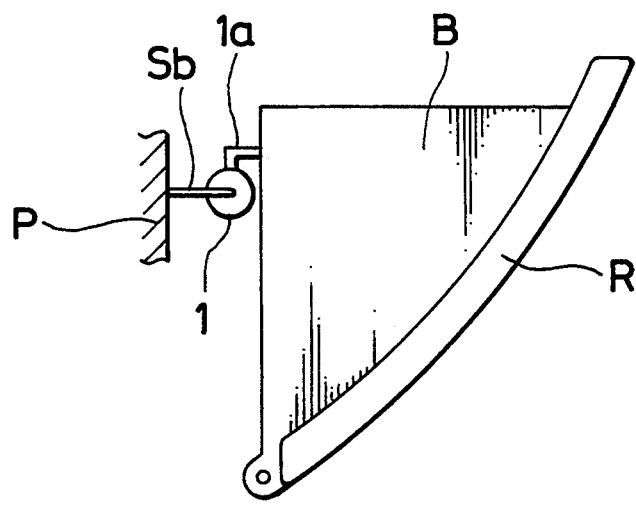
FIG. 4 is an explanatory view illustrating a third example of the state of attachment of the damper device.
Figure 5:
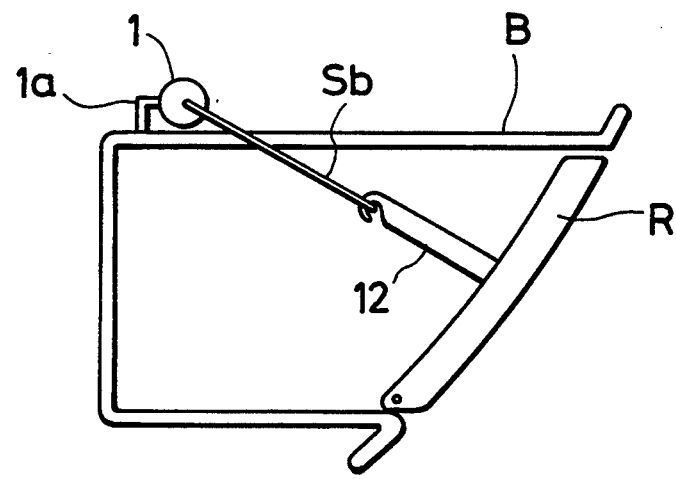
FIG. 5 is an explanatory view illustrating a fourth example of the state of attachment of the damper device.

Conceivably, this fixation is attained, as shown in FIG. 2, for example, by fixing the cylinder body 1 on the side of a dashboard P opposed to the rear face of a glove compartment B, and attaching the other terminal part Sb of the string member S fast to the a glove compartment lid R either directly or through a connecting member 12. Alternatingly, the fixation can be achieved as illustrated in FIG. 3 and FIG. 4, by fixing the cylinder body 1 on the lateral side or rear side of the glove compartment B and attaching the other terminal part Sb of the string member S on the corresponding side of the dashboard P, or, where the damper device is of the type adapted to be opened solely on the glove compartment lid R side, as shown in FIG. 5, by fixing the cylinder body 1 on the main body side of the glove compartment B and attaching the other terminal part Sb of the string member S fast to the open-shut type glove compartment lid R through the connecting member 12. In any case, the space used for the fixation is appreciably decreased.

When actual use, the glove compartment B is rotated under its own weight in the opening direction by releasing a lock means (not shown). The string member S is drawn outwardly, guided by the peripheral guide face 6a of the cap 6, and in response thereto, the piston 2 is moved toward the cap 6 in spite of the spring pressure of the compression coil spring 4 and the glove compartment B is allowed to rotate.

During this rotation of the glove compartment B, however, the motion of the piston 2 causes the air, while being passed through the minute pores in the air filter 10 and aspirated into the cylinder body 1 via the orifice 8a of the seating valve 8 as illustrated in FIG. 6, to brake the motion of the piston 2. As a consequence, the air controls opening motion of the glove compartment B and infallibly makes the glove compartment B rotate gradually in the opening direction.

The glove compartment B is shut simply by causing it to be rotated in the reverse direction. During this rotation, the urging spring pressure of the compression coil spring 4 compels the piston 2 to move in the direction opposite to the opening direction mentioned above and, at the same time, causes the string member S to be retracted into the cylinder body 1, guided by the peripheral guide face 6a of the cap 6.

At this time, however, due to the motion of the piston 2, the air on the rear terminal part side of the interior of the cylinder body tends to be compressed and is simultaneously made to pass through the air vent 7b in the rear wall 7 and the orifice 8a in the seating valve 8. Since this orifice 8a has a small diameter, the air is not freely passed therethrough, but moves the seating valve 8 away from the rear wall 7 in spite of the spring pressure of the backup spring 9. The result is that the air is allowed to flow into the cylindrical part 7a and find its way out through the minute pores in the air filter 10 into the ambient air as illustrated in FIG. 7. As a result, the shutting motion of the glove compartment B is controlled so as to ensure generation of smooth rotation of the glove compartment in the shutting direction.

When the pressure inside the cylindrical part 7a and that on the rear terminal part side of the cylinder body 1 are subsequently roughly equalized, the spring pressure of the backup spring 9 causes the seating valve 8 to collide against the rear wall 7 and assume the original state as illustrated in FIG. 8.

When the air flows into the cylindrical part 7a, the air filter 10 therein prevents this air from being discharged instantaneously into the ambient air, and ensures fine adjustment of the flow volume of air and gradual release thereof into the ambient air. As a result, the seating valve 8 is slowly returned and is precluded from emitting noise in its collision against the rear wall 7. Even if the collision happens to emit noise, this noise is prevented from being propagated into the ambient air due to the sound-abating action of the air filter 10.

Figure 9:
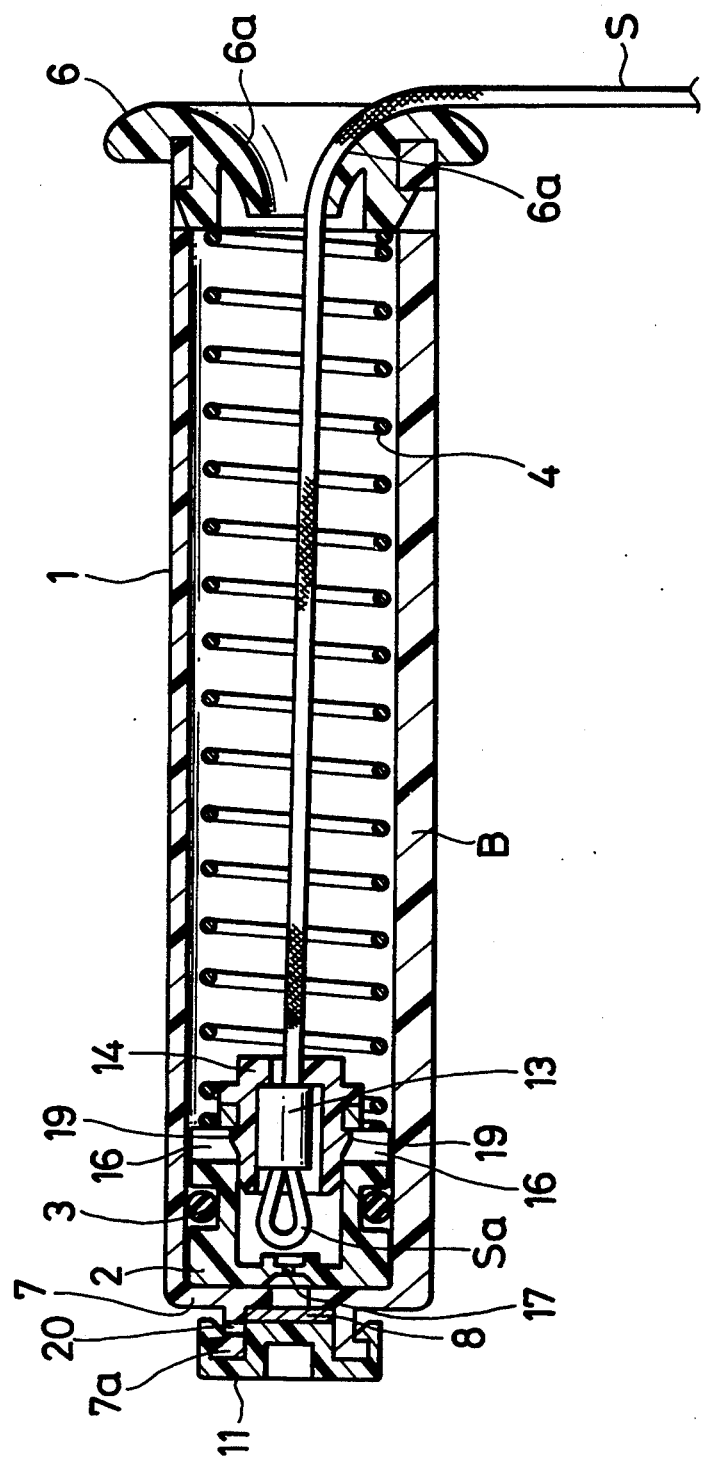
FIG. 9 is a cross section illustrating a second embodiment of the damper device according to this invention.

An air cylinder type damper device according to a second embodiment of this invention will be described below with reference to FIG. 9 to FIG. 12. In contrast to the first embodiment, which has the precondition of independently forming the cylinder body 1 and fixing the cylinder body 1 from behind on the glove compartment B or the dashboard P through the fitting part 1a, the second embodiment contemplates integrally forming a glove compartment B and a cylinder body 1 as shown in FIG. 9 and incorporating in the integrally formed cylinder body 1 a piston 2 having one terminal part Sa of a string member S connected thereto through a coupling piece 14.

The second embodiment, unlike the first embodiment, renders completely unnecessary the work of fixing the cylinder body 1 on the glove compartment B and therefore ensures a generous simplification of the assembly work and, as a result, promises fewer costs and saves installation space.

To be more specific, the second embodiment is identical with the first embodiment in that the cap 6 provided with the peripheral guide face 6a is fitted on the front opening part side of the cylinder body 1. It is different from the first embodiment in that, first of all, the one terminal part Sa of the string member S is connected to the piston 2 through the coupling piece 14, adapted to retain a calked piece 13 provided on the one terminal part Sa of the string member S.

Figure 10:
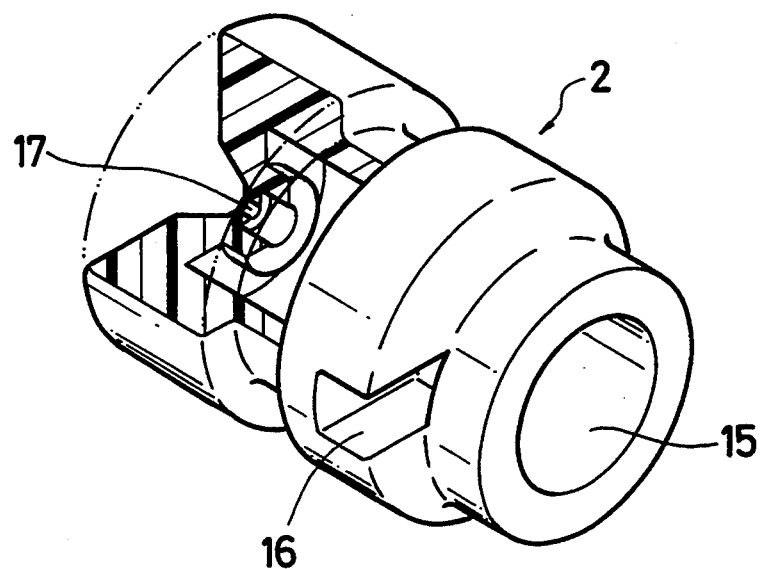
FIG. 10 is a partially cutaway perspective view illustrating a piston of the damper device of FIG. 9.
Figure 11:
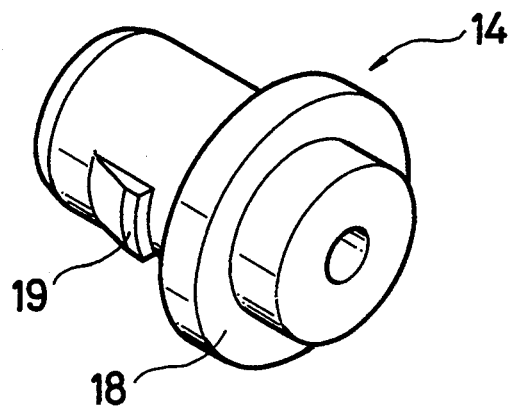
FIG. 11 is a perspective view illustrating a coupling device for the damper device of FIG. 9.

In the second embodiment, therefore, the piston 2 is formed as a hollow article. As shown in FIG. 10, an insertion mouth part 15 for allowing insertion therein of the coupling piece 14 and a pair of opposed slits 16 are formed on the front terminal part side of the piston 2, and an orifice 17 is bored on the rear terminal part side thereof. As illustrated in FIG. 11, the coupling piece 14 is formed as a cylindrical article whose outside diameter fits through the insertion mouth part 15 of the piston 2 and a flange part 18. A pair of fastening shoulders 19 are formed integrally on the outer circumferential part of the coupling piece 14.

When the string member S is inserted, with the other terminal part Sb (FIG. 12) side thereof at the lead, into the coupling piece 14, the calked piece 13 formed on the one terminal part Sa of the string member S is retained inside the coupling piece 14, and the coupling piece 14 is inserted into the insertion mouth part 15 of the piston 2. Then the fastening shoulder parts 19 of the coupling piece 14 are engaged with the inner edge parts of the corresponding slits 16, and the coupling piece 14 is attached fast to the piston 2, as illustrated in FIG. 9. As a result, the one terminal part Sa of the string member S is infallibly joined to the piston 2.

The interior of a cylindrical part 7a, provided as the rear wall 7 of the cylinder body 1, has a simple construction. Disposed therein is a seating valve 8 containing no orifice held by a flexible retainer 11. Owing to this construction, the incorporation of the cylindrical part 7a in the integrally formed cylinder body 1 is facilitated.

Figure 12:
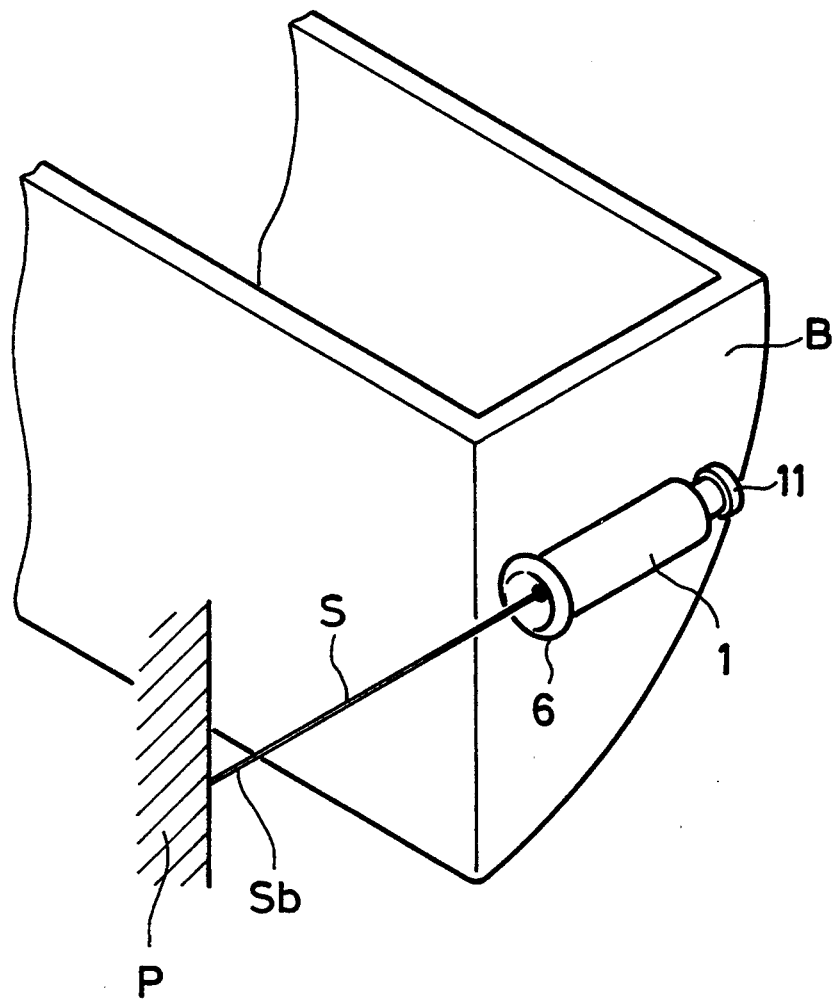
FIG. 12 is a perspective view of an essential part of the damper device of FIG. 9 and illustrating a first example of the part provided with a cylinder body of the damper device.
Figure 13:
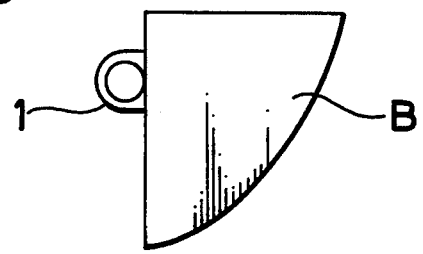
FIG. 13 is an explanatory view illustrating a second example of the part provided with the cylinder body.
Figure 14:
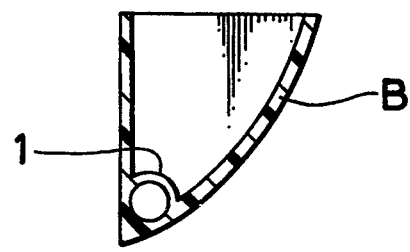
FIG. 14 is an explanatory view illustrating a third example of the part provided with the cylinder body.
Figure 15:
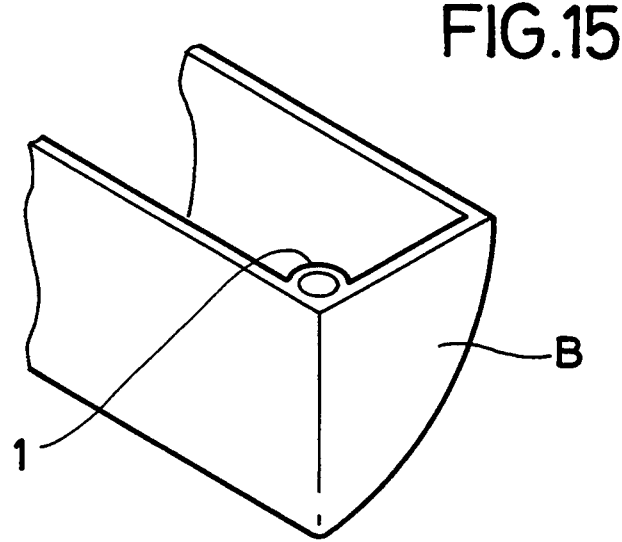
FIG. 15 is an explanatory view illustrating a fourth example of the part provided with the cylinder body.

In the second embodiment, therefore, it goes without saying that the damper device can be put to normal use, for example, by integrally forming as one piece the cylinder body 1 in a lateral state or a longitudinal state on the lateral surface of the glove compartment B, incorporating in this cylinder body 1 the piston 2 having one terminal part Sa of the string member S connected thereto through the coupling piece 14 and the compression coil spring 4, and causing the other terminal part Sb of the string member S to be extended over the guide face 6a the cap 6 and attached fast to the dashboard P, as illustrated in FIG. 12. The site and the directionality for the formation of the cylinder body 1 are not limited to those of the particular construction described above. Owing to the freedom in this respect and the freedom in selecting the direction of the disposition of the string member S by the cap 6, the optimum site can be freely and ideally selected on the rear side of the glove compartment B, on the bottom part side of the glove compartment B, or on the inner side of the lateral surface of the glove compartment B, as respectively illustrated in FIG. 13 to FIG. 15, depending on the shape of the glove compartment B or the positional relation of the cylinder body 1 with the dashboard P. If, in this case, the string member S is desired to be guided in a specific direction of disposition, the necessity for incorporating the independent guide means and the attendant fixing parts as found in the conventional damping device, can be obviated by having such guide means additionally formed integrally with the glove compartment B.

Further, in the second embodiment, as in the first embodiment, the cylinder body 1 is allowed to enjoy a reduction in size because the string member S is connected to the piston 2. The damp a device as a whole can be expected to enjoy a reduction in size because the cylinder body 1 is integrally formed with the glove compartment B.

Also, in the second embodiment, when the glove compartment B is allowed to rotate in the opening direction by the its own weight, the string member S is drawn outwardly, guided on the peripheral guide face 6a of the cap 6, and the piston 2 is consequently moved toward the cap 6 side in spite of the urging spring pressure of the compression coil spring 4. Air which then exists inside the cylinder body 1 is forced to flow through the interior of the coupling piece 14 and is aspirated through the orifice 17 of the piston 2 into the rear terminal part side of the cylinder proper 1. As a result, the piston 2 is placed under a braking force and the opening motion of the glove compartment B is controlled.

Conversely, when the glove compartment B is shut, the urging spring pressure of the compression coil spring 4 moves the piston 2 in the reverse direction and consequently compresses the air existing on the rear terminal part side of the interior of the cylinder body 1 and forces the air to flow through the air vent in the rear wall 7 and reach the seating valve 8. As a result, the flexible retainer 11 is deformed and the seating valve 8 is moved away from the rear wall 7, and the air under discussion is discharged into the ambient air through an air vent 20 formed in the lateral part of the cylindrical part 7a. Thus, the shutting motion of the glove compartment B is controlled as expected.

Owing to the adoption of the construction described above, this invention obviates the necessity for using an independent guide means for fixing the direction of disposition of the string member and the attendant parts and, therefore, permits a generous reduction in the number of component parts of the device and the number of steps of work assembly and enables the device to be effectively reduced in size and cost.

Moreover, the fact that the necessity for using a piston rod is obviated makes a contribution to the reduction in size of the cylinder body. Owing to this fact and the fact that the necessity for the guide means is obviated, the entire device can be installed in a small space at a desired site. Thus, the possibility of the storage cabinet succumbing to any limitation in the storage capacity can be precluded.

When the cylinder body is integrally formed with the storage cabinet, the entirety of the device enjoys a further reduction in size and the operation and effect of this invention described above is promoted and the work of assembly of the device is decisively simplified. Even from this point of view, the cost of the device can be expected to be appreciably decreased.

What is claimed is:

1. A damper device, comprising:
    a cylinder body having a front terminal opening;
    a piston slidably disposed inside said cylinder body;
    a string member having one end connected to said piston within said cylinder body and an other end extending out of said cylinder body through said front terminal opening;
    a cap on said front terminal opening of said cylinder body, said string member extending from said piston to said other end thereof through said cap, and said cap having a curved peripheral guide face defining an opening through which said string member extends, said guide face guiding said string member in movement in and out of said cylinder and defining said opening such that said string member can be pulled out of said cylinder from directions that are substantially non-axial with respect to said cylinder; and
    a spring member disposed inside said cylinder body biasing said piston in a direction tending to pull said string member into said cylinder body.

2. The damper device of claim 1, wherein said curved peripheral guide face curves from a portion thereof having an annular surface that faces radially inwardly and extends substantially axially, with respect to said cylinder body to a portion thereof that has an annular surface that faces substantially axially and extends substantially radially with respect to said cylinder body.

3. The damper device of claim 2, wherein said curved peripheral guide face further curves to a portion thereof having an annular surface that faces radially outwardly and extends substantially axially with respect to said cylinder body.

4. A damper device in combination with a storage cabinet, said combination comprising:
    a storage cabinet portion movable between an open position and a closed position;
    a cylinder body having a front terminal opening;
    a piston slidably disposed inside said cylinder body;
    a string member having one end connected to said piston within said cylinder body and an other end, wherein one of said cylinder body and said other end of said string member is fixed with said storage cabinet portion for movement therewith and the other of said cylinder body and said other end end is fixed relative to said storage cabinet;
    a cap on said front terminal opening of said cylinder body, said string member extending from said piston to said other end thereof through said cap, and said cap having a curved peripheral guide face defining an opening through which said string member extends, said guide face guiding said string member in movement in and out of said cylinder and defining said opening such that said string member can be pulled out of said cylinder from directions that are substantially non-axial with respect to said cylinder; and
    a spring member disposed inside said cylinder body biasing said piston in a direction tending to pull said string member into said cylinder body and move said storage cabinet portion to said closed position.

5. The damper device of claim 4, wherein said storage cabinet portion has said cylinder body fixed therewith, and wherein said storage cabinet portion and said cylinder body are integrally formed as one piece.

6. The damper device of claim 5, wherein said piston has a hook and said one end of said string member is connected to said hook.

7. The damper device of claim 5, wherein said one end of said string member is connected to a coupling piece and said coupling piece is attached to said piston.

8. The damper device of claim 7, wherein said piston has a front end defining an insertion mouth and a pair of opposed slits communicating with said insertion mouth, and said coupling piece has a pair of fastening shoulders engaging said opposed slits and a flange part abutting said front end of said piston.

9. The damper device of claim 4, wherein said piston has a hook and said one end of said string member is connected to said hook.

10. The damper device of claim 4, wherein said one end of said string member is connected to a coupling piece and said coupling piece is attached to said piston.

11. The damper device of claim 10, wherein said piston has a front end defining an insertion mouth and a pair of opposed slits communicating with said insertion mouth, and said coupling piece has a pair of fastening shoulders engaging said opposed slits and a flange part abutting said front end of said piston.

12. The damper device of claim 4, wherein said cylinder body has a rear end with a rear wall having a cylindrical portion extending rearwardly from said rear wall and having an open end and an air vent communicating the inside of said cylinder body with the inside of said cylindrical portion, an air filter fixed to said open end of said cylindrical portion and a seating valve inside said cylindrical portion having an orifice therein and biased against said rear wall over said air vent.

13. The damper device of claim 4, wherein said piston has a rear end having an orifice therein for allowing air to flow therethrough, and said cylinder body has a rear end with a rear wall having an air vent therein, a seating valve covering said air vent and a flexible retainer holding said seating valve over said air vent.

14. The damper device of claim 4, wherein said curved peripheral guide face curves from a portion thereof having an annular surface that faces radially inwardly and extends substantially axially with respect to said cylinder body to a portion thereof that has an annular surface that faces substantially axially and extends substantially radially with respect to said cylinder body.

15. The damper device of claim 14, wherein said curved peripheral guide face further curves to a portion thereof having an annular surface that faces radially outwardly and extends substantially axially with respect to said cylinder body.

* * * * *